(12) United States Patent
Zhou et al.

(10) Patent No.: US 9,843,549 B2
(45) Date of Patent: Dec. 12, 2017

(54) METHOD, SYSTEM AND CLIENT FOR DIRECTIONALLY PUBLISHED MICROBLOG MESSAGES

(71) Applicant: TENCENT TECHNOLOGY (SHENZHEN) COMPANY LIMITED, Shenzhen, Guangdong (CN)

(72) Inventors: Zhihao Zhou, Shenzhen (CN); Ming Tian, Shenzhen (CN); Li Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 526 days.

(21) Appl. No.: 14/488,618

(22) Filed: Sep. 17, 2014

(65) Prior Publication Data

US 2015/0006658 A1   Jan. 1, 2015

Related U.S. Application Data

(63) Continuation of application No. PCT/CN2014/073796, filed on Mar. 20, 2014.

(30) Foreign Application Priority Data

Jun. 9, 2013   (CN) .......................... 2013 1 02319943

(51) Int. Cl.
*G06F 15/16* (2006.01)
*H04L 12/58* (2006.01)
(Continued)

(52) U.S. Cl.
CPC .............. *H04L 51/22* (2013.01); *H04L 51/32* (2013.01); *H04L 67/02* (2013.01); *H04W 4/206* (2013.01)

(58) Field of Classification Search
CPC ......... H04L 51/22; H04L 67/42; H04L 51/32; H04L 67/02; H04L 12/58; H04L 29/06; H04W 4/206
See application file for complete search history.

(56) References Cited

U.S. PATENT DOCUMENTS 8,935,618 B2 * 1/2015 Zhang .................. H04L 12/588
715/753
2010/0185519 A1   7/2010 Ramaswamy
(Continued)

FOREIGN PATENT DOCUMENTS

| CN | 102375865 A | 3/2012 |
| CN | 102867001 A | 1/2013 |
| CN | 103023753 A | 4/2013 |

OTHER PUBLICATIONS

Notification of the First Office Action of Chinese application No. 201310231994.3 , dated Nov. 22, 2016.
(Continued)

*Primary Examiner* — Cheikh Ndiaye
(74) *Attorney, Agent, or Firm* — Oppedahl Patent Law Firm LLC

(57) ABSTRACT

Method, system and device for acquiring directionally published microblog messages are disclosed. A first client acquires an instruction for reading a microblog message from a first user, wherein the instruction comprises a keyword of the first user; the first client extracts directionally published microblog messages matching with the keyword of the first user from an outbox of a second user, wherein the second user is followed the first user and has a directional publishing authority; and the first terminal displays the extracted directionally published microblog messages to the first user. Through the solutions provided the present disclosure, a first user only needs to access an outbox of a second user for acquiring a microblog message, and thus the
(Continued)

first user does not need to delete the microblog message. The operation of the first user is simplified, and thereby the user experience will be improved.

13 Claims, 3 Drawing Sheets

(51) Int. Cl.
*H04L 29/08* (2006.01)
*H04W 4/20* (2009.01)

(56) References Cited

U.S. PATENT DOCUMENTS

2011/0178995 A1\* 7/2011 Suchter ............. G06F 17/30864
  707/692
2012/0066312 A1\* 3/2012 Kandekar ......... G06F 17/30144
  709/205
2014/0122629 A1 5/2014 Ku

OTHER PUBLICATIONS

International Search Report in international application No. PCT/CN2014/073796, dated Jun. 30, 2014.
English Translation of the Written Opinion of the International Search Authority in international application No. PCT/CN2014/073796, dated Jun. 30, 2014.

\* cited by examiner

METHOD, SYSTEM AND CLIENT FOR DIRECTIONALLY PUBLISHED MICROBLOG MESSAGES

CROSS REFERENCE TO RELATED APPLICATIONS

This is a continuation application of International Patent Application No.PCT/CN2014/073796, filed on Mar. 20, 2014, which claims priority to Chinese Patent Application CN201310231994.3 filed on Jun. 9, 2013, the disclosure of which are incorporated by reference herein in their entirety.

TECHNICAL FIELD

The present disclosure relates to the field of microblog push technology, and in particular to method, system and client for acquiring directionally published microblog messages.

BACKGROUND

Traditionally, a so called diffusion way is adopted when a microblog message is required to be directionally published to a large number of predetermined target users. The microblog message to be published is written into the inbox of each predetermined target user, and the predetermined target user then reads the microblog message. After that, the predetermined target user may have to delete the microblog message. The disadvantages of the so called diffusion way involves: (1) the operations of the diffusion way are very complex; (2) a microblog message may be sent to some users, while those users do not wish to receive this microblog message.

Therefore, there is needed a new method for acquiring directionally published microblog messages.

SUMMARY

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The present disclosure provides method, system and client for acquiring directionally published microblog messages.

Therefore, the present disclosure provides a method for acquiring directionally published microblog messages, comprising:

a first client acquires an instruction for reading a microblog message from a first user, wherein the instruction comprises a keyword of the first user;

the first client extracts directionally published microblog messages matching with the keyword of the first user from an outbox of a second user, wherein the second user is followed the first user and has a directional publishing authority; and the first terminal displays the extracted directionally published microblog messages to the first user.

Further, the present disclosure provides a client, comprising: a matching module and a display module; wherein the matching module is configured to acquire an instruction for reading a microblog message from a first user, wherein the instruction comprises a keyword of the first user, and extract directionally published microblog messages matching with the keyword of the first user from an outbox of a second user, and transmit the extracted directionally published microblog messages to the display module, wherein the second user is followed the first user and has a directional publishing authority; the display module is configured to display the extracted directionally published microblog messages transmitted from the matching module.

The present disclosure provides a client, comprising: a keyword extraction module configured to extract a keyword of a directionally published microblog message to be published by a second user, and store the directionally published microblog message and the keyword of the directionally published microblog message in an outbox of the second user in a server.

In yet another embodiment, the present disclosure provides a system for acquiring directionally published microblog messages, comprising: the first client according to the present disclosure, the second client according to the present disclosure and a server, wherein the server is configured to maintain outboxes of users Since a keyword of a first user is compared with the keywords of the directionally published microblog messages published by a second user, only those directionally published microblog messages having a keyword that is the same or similar as the keyword of the first user will be extracted and displayed, the first user thus will receive fewer unconcerned microblog messages. Furthermore, since the directionally published microblog messages published by the second user are stored in the outbox of the second user, the first user only needs to access the outbox of the second user for acquiring a microblog message, and thus the first user does not need to delete the microblog message. Therefore, the operation of the first user is simplified, and thereby the user experience will be improved.

DETAILED DESCRIPTION

According to the present disclosure, a first client acquires an instruction for reading a microblog message from a first user, wherein the instruction comprises a keyword of the first user; the first client extracts directionally published microblog messages matching with the keyword of the first user from an outbox of a second user, wherein the second user is followed the first user and has a directional publishing authority; and the first terminal displays the extracted directionally published microblog messages to the first user.

The present disclosure will be further described below in conjunction with the accompanying drawings and embodiments in detail.

Figure 1:
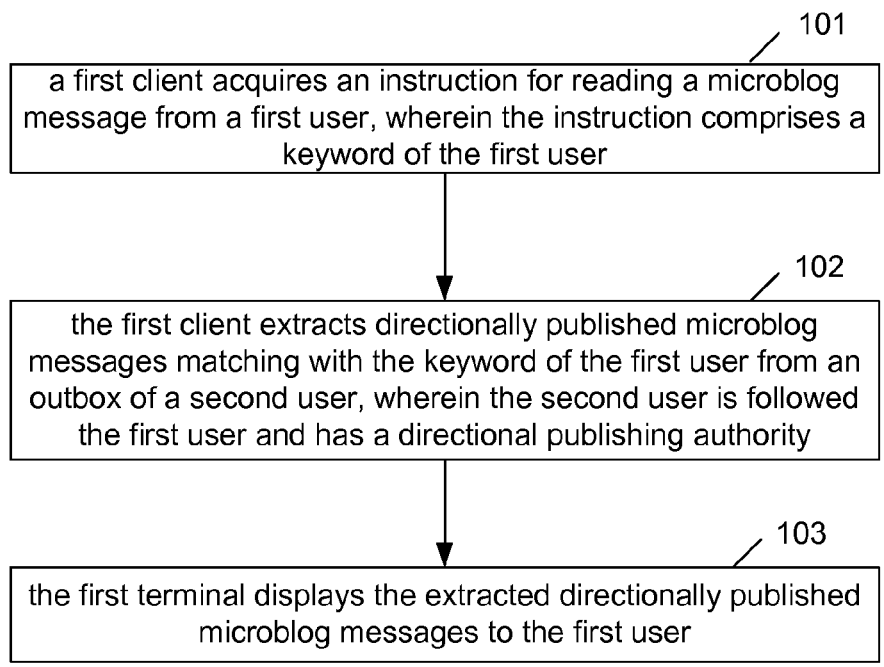
FIG. 1 is a flowchart of a method for reading microblog messages according to an embodiment of the present disclosure.

FIG. 1 illustrates a method for acquiring directionally published microblog messages according to one embodiment of the present disclosure, wherein the method includes the following steps:

Step 101: a first client acquires an instruction for reading a microblog message from a first user, wherein the instruction comprises a keyword of the first user.

Step 102: the first client extracts directionally published microblog messages matching with the keyword of the first user from an outbox of a second user, wherein the second user is followed the first user and has a directional publishing authority.

Here, the keyword of the first user includes: a personalized tag set by the first user, and/or, the keyword of microblog published by the first user within a preset time period, and/or, a classified keyword of the first user based on a listening chain, wherein the preset time period can be set according to an actual requirement, for example, the recent one or three months.

The step of extracting directionally published microblog messages matching with the keyword of the first user from an outbox of a second user comprises may include: the first client compares the keyword of the first user with keywords of the directionally published microblog messages in the outbox of the second user, so as to extract the directionally published microblog messages having a keyword that is the same as or similar to the keyword of the first user.

Furthermore, when the directionally published microblog matching the keyword of the first user is extracted from the outbox of the second user, the personalized tag set by the first user and/or the keyword of microblog published by the first user within the preset time period is/are preferably selected as the keyword of the first user; and if the number of the microblog messages extracted from the outbox of the second user according to the keyword of the first user is less than the preset number, the classified keyword of the first user based on the listening chain is also selected as the keyword of the first user to extract the matched microblog messages from the outbox of the second user.

The preset number may be set according to an actual requirement, such as 10.

Step 103: the first terminal displays the extracted directionally published microblog messages to the first user.

Here, the extracted directionally published microblog messages may be displayed to the first user after the extracted directionally published microblog messages have been rearranged.

The microblog messages are rearranged in a descending order of the relevancies between the microblog messages and the keyword of the first user, wherein the microblog messages having the same relevancy are further rearranged according to a time line, and the relevancy is the number of keywords of the microblog messages that are the same as or similar to the keyword of the first user.

Figure 2:
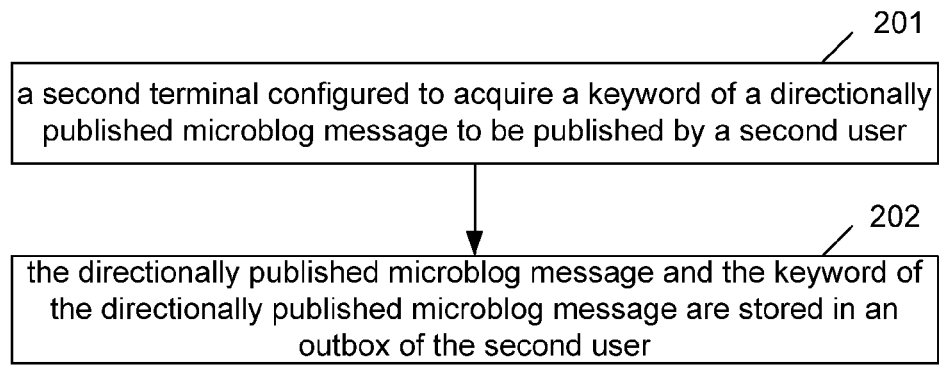
FIG. 2 is a flowchart of a method for publishing microblog messages according to an embodiment of the present disclosure.

FIG. 2 illustrates a method for acquiring directionally published microblog messages provided by the present disclosure, which includes the following steps:

Step 201: A second client acquires a keyword of a microblog message to be directionally published by a second user.

Here, the step that a second client acquires a keyword of a microblog message to be directionally published by a second user is: the second terminal acquires the keyword of the microblog message to be directionally published by the second user according to contents of the microblog message to be directionally published by the second user; or the second terminal determines the keyword of the microblog message to be directionally published by the second user after the second user deletes, adds and or modifies the acquired keyword of the microblog message to be directionally published by the second user.

Furthermore, after Step 201, the second client can further acquire and display a user coverage corresponding to the keyword of the microblog message directionally published by the second user.

The user coverage rate is the ratio of the number of users who listen to the second user and have the same/similar keywords as that of at least one of the directionally published microblog messages to the sum of users listening to the second user.

Furthermore, after the user coverage rate corresponding to the keyword of the directionally published microblog message has been acquired, the microblog keyword can be re-extracted.

Step 202: the directionally published microblog message and the keyword of the directionally published microblog message are stored in an outbox of the second user.

Figure 3:
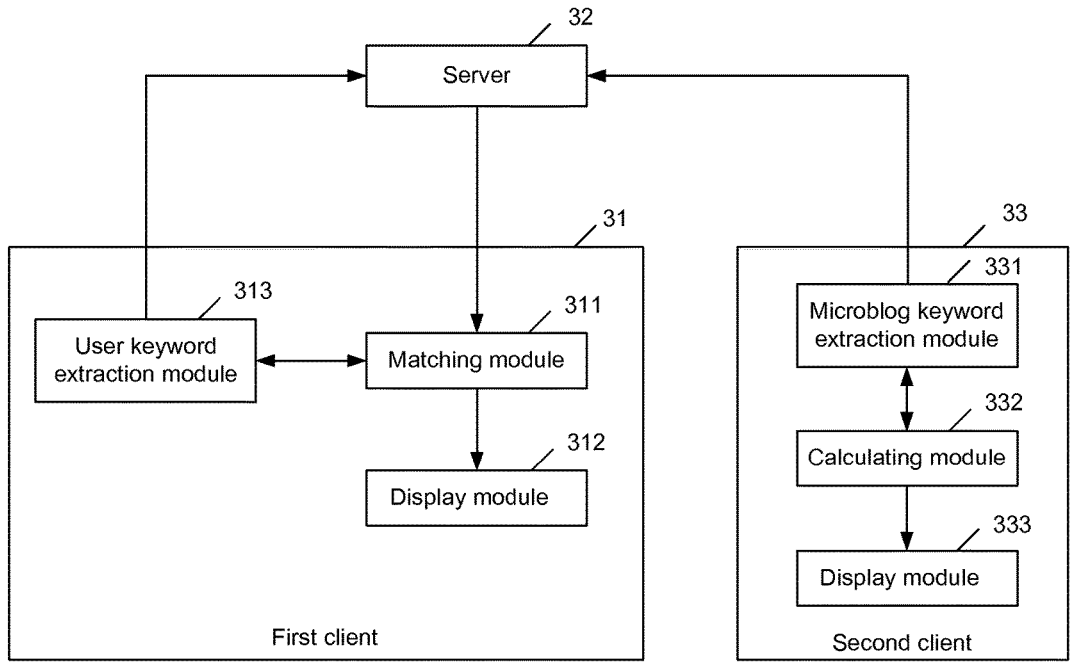
FIG. 3 is a structural diagram of a system for acquiring directionally published microblog messages according to an embodiment of the present disclosure.

FIG. 3 illustrates a system for acquiring directionally published microblog messages, and the system comprises a first client 31 and a server 32, wherein the first client 31 is configured to acquire an instruction for reading a microblog message from a first user, wherein the instruction comprises a keyword of the first user, and extract directionally published microblog messages matching with the keyword of the first user from an outbox of a second user, wherein the second user is followed the first user and has a directional publishing authority, and display the extracted directionally published microblog messages to the first user; and the server 32 is configured to maintain outboxes of users.

The system further includes: a second client 33 configured to acquire a keyword of a directionally published microblog message to be published by a second user, and transmit the microblog message to be directionally published and its keyword to the server 32; and correspondingly, the server 32 is further configured to store the microblog to be directionally published and its keyword transmitted from the second client 33 to the outbox of the second user.

The first client 31 is further configured to store the keyword of the first user and send the keyword of the first user to the server 32; and correspondingly, the server 32 is further configured to store the keyword of the first user transmitted from the first client 31. Here, the keyword of the first user may include: a personalized tag set by the first user, and/or, the keyword of microblog published by the first user within the preset time period, and/or, a classified keyword of the first user based on a listening chain, wherein the preset time period can be set according to an actual requirement, for example, the recent one or three months.

The first client 31 is specifically configured to compare the keyword of the first user with keywords of the directionally published microblog messages in the outbox of the second user, so as to extract the directionally published microblog messages having a keyword that is the same as or similar to the keyword of the first user.

The first client 31 is specifically configured to rearrange the extracted microblog messages and then display them to the first user, wherein the extracted microblog messages is to rearrange the microblog messages in a descending order of the relevancies between the microblog messages and the user keyword; the microblog messages having the same relevancy are further rearranged according to a time line; and the relevancy is the number of keywords of the microblog messages that are the same as or similar to the user keyword.

The second client 33 is further configured to, when the second user needs to directionally publish a microblog message, acquire a user coverage rate corresponding to the keyword of the microblog message. The acquisition of keyword of the microblog to be directionally published may be: extracting the keyword according to the contents of the microblog message to be directionally published, or determining the keyword of the microblog message to be directionally published according to the operation of deleting, adding and/or modifying the extracted keyword of the user.

The second client 33 is specifically configured to calculate a coverage, wherein the coverage is the ratio of the number of users who listen to the second user and have the same/similar keywords as that of at least one of the directionally published microblog messages to the sum of users listening to the second user.

The first client 31 includes a matching module 311 and a display module 312, wherein the matching module 311 is configured to acquire an instruction for reading a microblog message from a first user, wherein the instruction comprises a keyword of the first user, and extract directionally published microblog messages matching with the keyword of the first user from an outbox of a second user, and transmit the extracted directionally published microblog messages to the display module 312, wherein the second user is followed the first user and has a directional publishing authority; and the display module 312 is configured to display the extracted directionally published microblog messages transmitted from the matching module.

The first client 31 further includes a user keyword extraction module 313, which is configured to save the keyword of the first user and send it to the server 32, wherein the keyword of the first user includes a personalized tag set by the first user, and/or the keyword of microblog published by the first user within the preset time period, and/or a classified keyword of the first user based on a listening chain.

The matching module 311 is specifically is further configured to compare the keyword of the first user stored in the keyword extraction module 313 with keywords of the directionally published microblog messages in the outbox of the second user, so as to extract the directionally published microblog messages having a keyword that is the same as or similar to the keyword of the first user, the user keyword extraction module 313 is further configured to provide the matching module 311 with the keyword of the first user.

The display module 312 is further display the extracted directionally published microblog messages that have been rearranged; and correspondingly, the matching module 311 is specifically configured to rearrange the directionally published microblog messages and then transmit them to the display module 312.

The matching module 311 is specifically configured to rearrange the relevancies between the directionally published microblog messages and the keyword of the first user stored in the user keyword extraction module 313 in a descending order, wherein the microblog messages having the same relevancy are further rearranged according to a time line, and the relevancy is the number of keywords of the microblog messages that are the same or similar as the keyword of the first user.

The second client 33 includes a microblog keyword extraction module 331, which is configured to acquire the keyword of the microblog message to be directionally published by the second user, and store the microblog message to be directionally published and its keyword to the outbox of the second user in the server 32.

The second client 33 further includes a calculating module 332, which is configured to acquire the keyword of the directionally published microblog message from the microblog keyword extraction module 331, and calculate a user coverage rate corresponding to the keyword of the directionally published microblog message and send the user coverage rate to the display module 333; and correspondingly, the display module 333 is further configured to display the user coverage rate transmitted from the calculating module 332.

The calculating module 332 is specifically configured to calculate a coverage, and the coverage is the ratio of the number of users who listen to the second user and have the same/similar keywords as that of at least one of the directionally published microblog messages to the sum of users listening to the second user.

The technical solutions provided by the present disclosure will be further described below through the embodiments in detail.

First Embodiment

Figure 4:
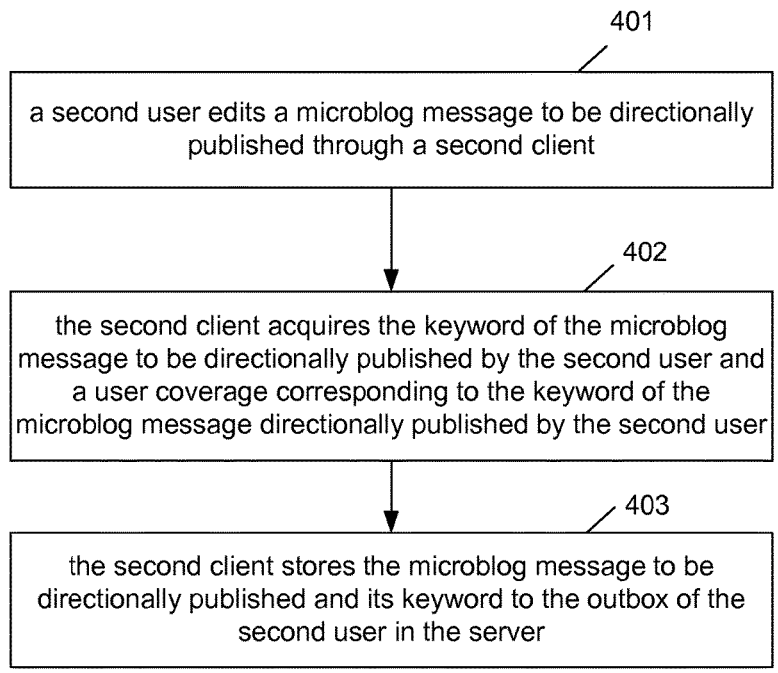
FIG. 4 is a flowchart according to a first embodiment of the present disclosure.

FIG. 4 is a method for publishing a microblog message according to an embodiment of the present disclosure, which may comprise:

Step 401: a second user edits a microblog message to be directionally published through a second client.

Step 402: the second client acquires the keyword of the microblog message to be directionally published by the second user and a user coverage corresponding to the keyword of the microblog message directionally published by the second user.

Step 403: the second client stores the microblog message to be directionally published and its keyword to the outbox of the second user in the server.

Figure 5:
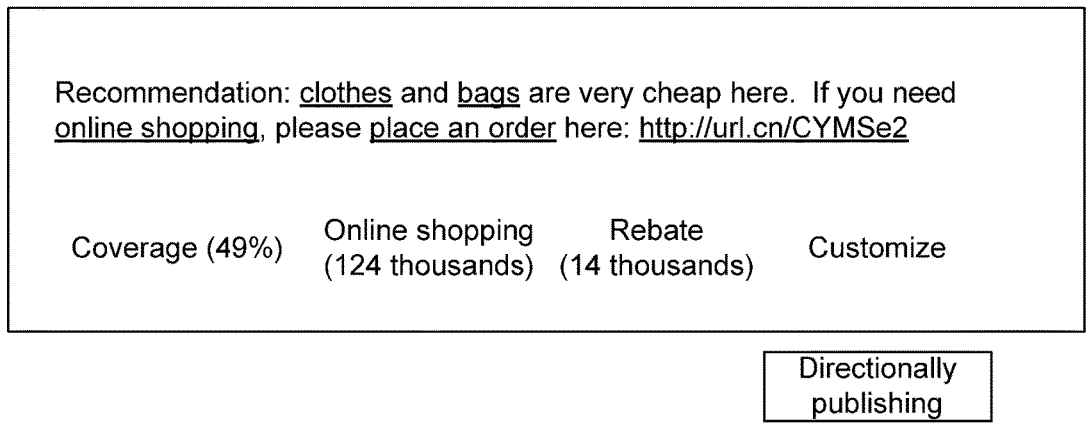
FIG. 5 is an operation interface for publishing microblog messages according to an embodiment of the present disclosure.

In this embodiment, the operation interface where the second user edits the directionally published microblog and acquires its keyword is as shown in FIG. 5, wherein a user group having the similar interests is preferably selected from fans as publishing objects of the directional publishing according to the microblog keyword and the user keyword of the fans, and the fan number of the user group is displayed thereafter. An automatically generated keyword can be deleted and a custom keyword is added in the end to modify the publishing group. Furthermore, the user coverage rate of the directional microblog under the current keyword selection condition can be seen intuitively, and after it is confirmed to be correct, click "directional publishing"; and the microblog will be saved to the outbox of the second user, including the microblog keyword and the classified keyword related to the microblog.

So, through the technical solution provided by the embodiments of the present disclosure, the user range covered by the keyword of the microblog being published directionally can be viewed in real time, and accordingly, the user can see the publishing effect intuitively and the using experience is improved. In addition, because the microblog is saved in the outbox of the second user, the first user does not need to delete the microblog of the second user when operating it, which simplifies the operation of the first user.

Second Embodiment

Figure 6:
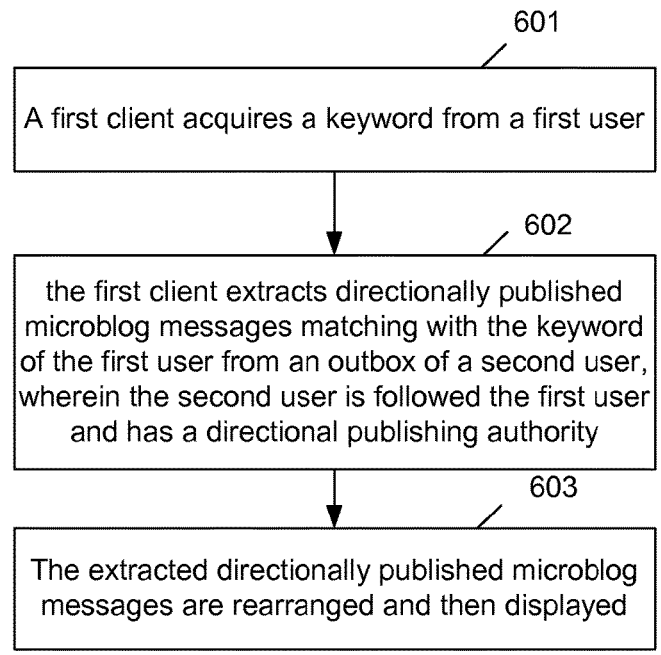
FIG. 6 is a flowchart according to a second embodiment of the present disclosure.

FIG. 6 is a method for reading a microblog message, which may include:

Step 601: a first client acquires a keyword from a first user.

The keyword of the first user is a personalized tag set by the first user, and/or, a keyword of a microblog message published by the first user within a preset time period, and/or, a classified keyword of the first user based on a listening chain.

In addition, during the extraction of keyword of the first user, such keywords as brand and industry, which have entity meanings, are preferably selected to be saved, and the classified keyword is not recommended unless the user coverage rate of such keywords is too low.

Step 602: the first client extracts directionally published microblog messages matching with the keyword of the first user from an outbox of a second user, wherein the second user is followed the first user and has a directional publishing authority.

For example, the first client may compare the keyword of the first user with the keywords of the directionally published microblog messages in the inbox of each second user whom the first user listens to, and when a keyword of the directionally published microblog message satisfies the hobby and interest of the first user, then the directionally published microblog message will be acquired and displayed to the first user.

Step 603: The extracted directionally published microblog message are rearranged and displayed.

For example, the microblogs are rearranged according to a time line and then displayed.

Since a keyword of a first user is compared with the keywords of the directionally published microblog messages published by a second user, only those directionally published microblog messages having a keyword that is the same or similar as the keyword of the first user will be extracted and displayed, the first user thus will receive fewer unconcerned microblog messages. Furthermore, since the directionally published microblog messages published by the second user are stored in the outbox of the second user, the first user only needs to access the outbox of the second user for acquiring a microblog message, and thus the first user does not need to delete the microblog message. Therefore, the operation of the first user is simplified, and thereby the user experience will be improved.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

What said above are only the preferred embodiments of the disclosure and not intended to limit the scope of protection of the disclosure.

The invention claimed is:

1. A method for acquiring directionally published microblog messages, comprising:

acquiring, by a first terminal, an instruction for reading a microblog message from a first user of the first terminal, wherein the instruction comprises a keyword of the first user;

extracting, by the first terminal, directionally published microblog messages matching with the keyword of the first user from an outbox of a second user, wherein the second user is followed the first user and has a directional publishing authority; and displaying, by the first terminal, the extracted directionally published microblog messages to the first user;

wherein the step of extracting, by the first terminal, directionally published microblog messages matching with the keyword of the first user from an outbox of a second user comprises:

comparing, by the first terminal, the keyword of the first user with keywords of the directionally published microblog messages in the outbox of the second user, so as to extract the directionally published microblog messages having a keyword that is the same as or similar to the keyword of the first user;

wherein the method further comprises:

acquiring, by a second terminal of the second user, a keyword of a microblog message to be directionally published by the second user;

storing the microblog message to be directionally published by the second user and the keyword of the microblog message to be directionally published by the second user in the outbox of the second user;

calculating and displaying in real time, by the second terminal, a user coverage rate corresponding to the keyword of the microblog message directionally published by the second user;

wherein the user coverage rate is the ratio of the number of users who listen to the second user and have the same/similar keywords as that of at least one of the directionally published microblog messages to the sum of users listening to the second user.

2. The method according to claim 1, wherein the keyword of the first useris selected from:

a personalized tag set by the first user; and/or a keyword of a microblog message published by the first user within a preset time period; and/or a classified keyword of the first user based on a listening chain.

3. The method according to claim 1, wherein the step of presenting the directionally published microblog message on the first terminal to the first user comprises:

presenting, by the first terminal, the directionally published microblog messages tothe first user after the directionally published microblog messages have been rearranged by the first terminal.

4. The method according to claim 1, wherein the step of acquiring, by a second terminal, keywords of microblog messages to be directionally published by the second user comprises:

acquiring, by the second terminal, the keyword of the microblog message to be directionally published by the second user according to contents of the microblog message to be directionally published by the second user; or determining, by the second terminal, the keyword of the microblog message to be directionally published by the second user after the second user deletes, adds and or modifies the acquired keyword of the microblog message to be directionally published by the second user.

5. A system for acquiring directionally published microblog messages, comprising: a first terminal, a second terminal and a server, wherein the first terminal comprises:
one or more processors;
a memory; and
a plurality of program modules, when, executed by the one or more processors, cause the first terminal to perform predefined functions, the plurality of program modules further comprising: a matching module, a first display module and a first keyword extraction module; wherein the matching module is configured to acquire an instruction for reading a microblog message from a first user, wherein the instruction comprises a keyword of the first user, and extract directionally published microblog messages matching with the keyword of the first user from an outbox of a second user, and transmit the extracted directionally published microblog messages to the first display module, wherein the second user is followed the first user and has a directional publishing authority;

the first display module is configured to display the extracted directionally published microblog messages transmitted from the matching module; and the first keyword extraction module configured to extract the keyword of the first user;

wherein the matching module is further configured to compare the keyword of the first user stored in the keyword extraction module with keywords of the directionally published microblog messages in the outbox of the second user, so as to extract the directionally published microblog messages having a keyword that is the same as or similar to the keyword of the first user;

the second terminal comprises:
one or more processors;
a memory; and
a plurality of program modules, when, executed by the one or more processors, cause the second terminal to perform predefined functions, the plurality of program modules further comprising: a second keyword extraction module, a calculating module and a second display module; wherein the second keyword extraction module is configured to extract a keyword of a directionally published microblog message to be published by the second user, and store the directionally published microblog message and the keyword of the directionally published microblog message in an outbox of the second user in the server;

the calculating module is configured to acquire the keyword of the directionally published microblog message from the second keyword extraction module, and calculate a user coverage rate corresponding to the keyword of the microblog message directionally published by the second user, and transmit the user coverage rate to the second display module; and the second display module is configured to display in real time the user coverage rate transmitted from the calculating module;

wherein the user coverage rate is the ratio of the number of users who listen to the second user and have the same/similar keywords as that of at least one of the directionally published microblog messages to the sum of users listening to the second user; and the server is configured to maintain outboxes of users.

6. The system according to claim 5,
wherein the keyword of the first user is selected from: a personalized tag set by the first user; and/or a keyword of a microblog message published by the first user within a preset time period; and/or a classified keyword of the first user based on a listening chain.

7. The system according to claim 6, wherein the first keyword extraction module is further configured to provide the matching module with the keyword of the first user.

8. The system according to claim 7, wherein the matching module is configured to rearrange the extracted directionally published microblog messages; and the first display module is further configured to display the extracted directionally published microblog messages that have been rearranged.

9. A terminal, comprising:
one or more processors;
a memory; and
a plurality of program modules, when, executed by the one or more processors, cause the terminal to perform predefined functions, the plurality of program modules further comprising: a keyword extraction module, a calculating module and a display module; wherein the keyword extraction module is configured to extract a keyword of a directionally published microblog message to be published by a second user, and store the directionally published microblog message and the keyword of the directionally published microblog message in an outbox of the second user in a server;

the calculating module is configured to acquire the keyword of the directionally published microblog message from the keyword extraction module, and calculate a user coverage rate corresponding to the keyword of the microblog message directionally published by the second user, and transmit the user coverage rate to the display module; and the display module is configured to display in real time the user coverage rate transmitted from the calculating module;

wherein the user coverage rate is the ratio of the number of users who listen to the second user and have the same/similar keywords as that of at least one of the directionally published microblog messages to the sum of users listening to the second user.

10. The terminal according to claim 9, wherein the keyword extraction module is configured to extract the keyword of the microblog message to be directionally published by the second user according to contents of the microblog message to be directionally published by the second user, or determine the keyword of the microblog message to be directionally published by the second user after the second user deletes, adds and or modifies the extracted keyword of the microblog message to be directionally published by the second user.

11. A system for acquiring directionally published microblog messages, comprising: the first client according to claim 5, the second client according to claim 9 and a server, wherein the server is configured to maintain outboxes of users.

12. A non-transitory computer readable storage medium having computer executable instructions stored thereon, the instructions are executable by one or more processors to:
- acquire an instruction for reading a microblog message from a first user of a first terminal, wherein the instruction comprises a keyword of the first user;
- extract directionally published microblog messages matching with the keyword of the first user from an outbox of a second user;
- transmit the extracted directionally published microblog messages from a matching module to a first display module, wherein the second user is followed the first user and has a directional publishing authority; and
- display the extracted directionally published microblog messages transmitted from the matching module;
- wherein the instructions are further executable by one or more processors to:
- compare the keyword of the first user stored in a first keyword extraction module with keywords of the directionally published microblog messages in the outbox of the second user, so as to extract the directionally published microblog messages having a keyword that is the same as or similar to the keyword of the first user.

13. A non-transitory computer readable storage medium having computer executable instructions stored thereon, the instructions are executable by one or more processors to:
- extract a keyword of a directionally published microblog message to be published by a second user;
- store the directionally published microblog message and the keyword of the directionally published microblog message in an outbox of the second user in a server;
- acquire the keyword of the directionally published microblog message from a keyword extraction module;
- calculate a user coverage rate corresponding to the keyword of the microblog message directionally published by the second user;
- transmit the user coverage rate to a display module; and
- display in real time the user coverage rate transmitted from a calculating module;
- wherein the user coverage rate is the ratio of the number of users who listen to the second user and have the same/similar keywords as that of at least one of the directionally published microblog messages to the sum of users listening to the second user.

* * * * *